Figure 1:
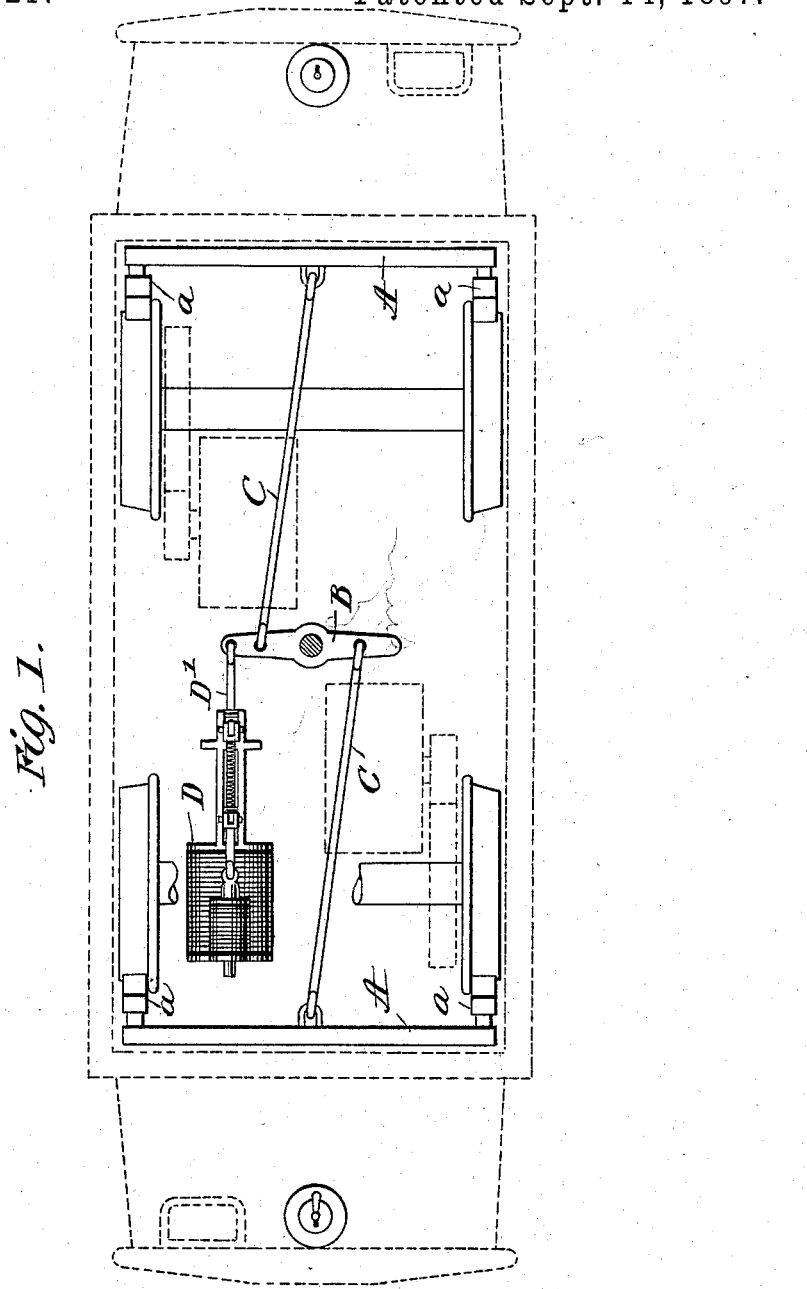

(No Model.) 3 Sheets—Sheet 1.

J. R. PRICE.
BRAKE MECHANISM FOR POWER DRIVEN VEHICLES.

No. 590,021. Patented Sept. 14, 1897.

WITNESSES:
Frank S. Ober.
Catharine Georgi

INVENTOR
John R. Price
BY
Baldwin Davidson & Wight
ATTORNEYS (No Model.) 3 Sheets—Sheet 2.
J. R. PRICE.
BRAKE MECHANISM FOR POWER DRIVEN VEHICLES.
No. 590,021. Patented Sept. 14, 1897.
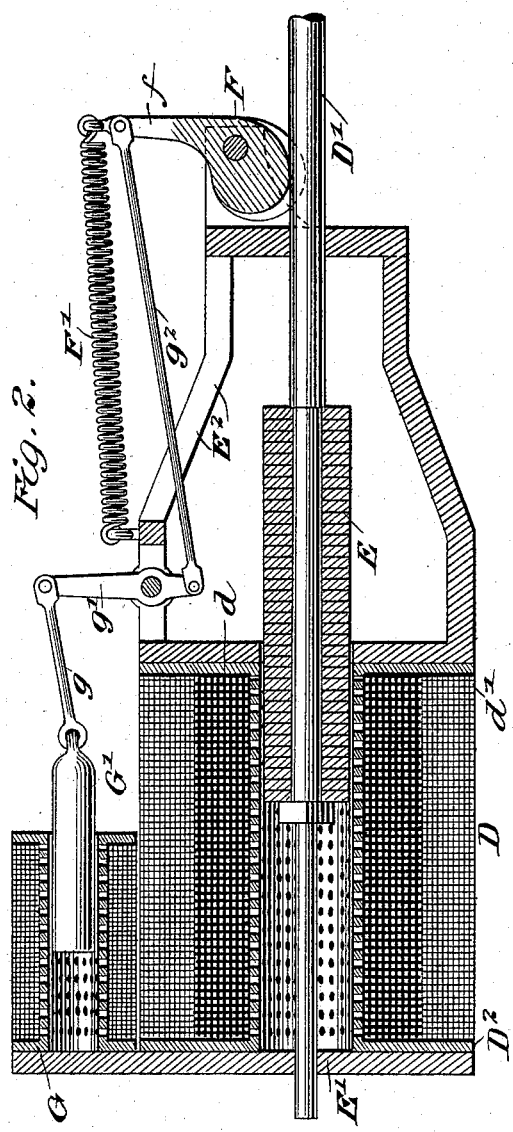

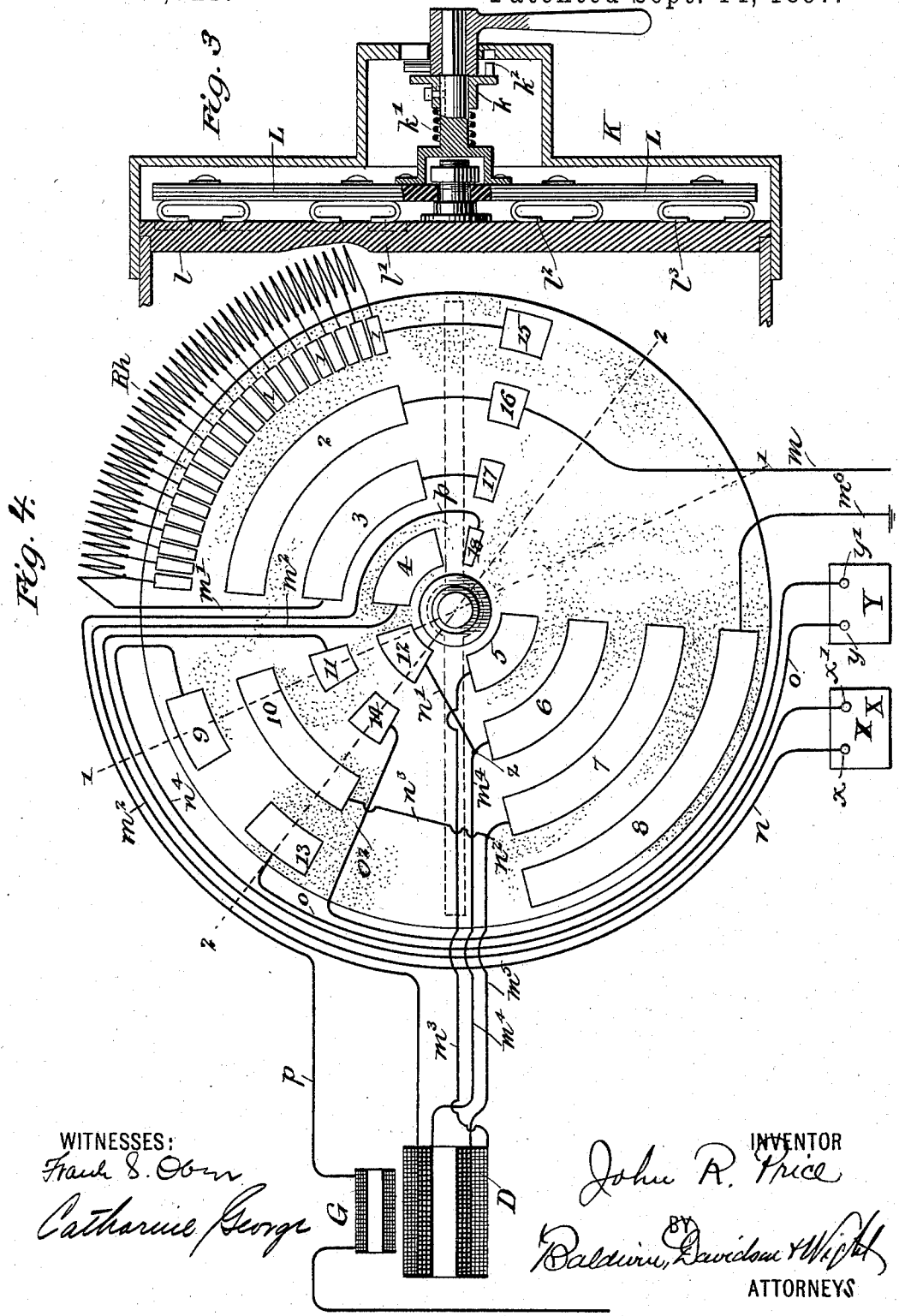

UNITED STATES PATENT OFFICE.

JOHN R. PRICE, OF BROOKLYN, NEW YORK, ASSIGNOR OF ONE-HALF TO WILLIAM H. DARLING, OF SAME PLACE.

BRAKE MECHANISM FOR POWER-DRIVEN VEHICLES.

SPECIFICATION forming part of Letters Patent No. 590,021, dated September 14, 1897.

Application filed May 12, 1897. Serial No. 636,182. (No model.)

*To all whom it may concern:*

Be it known that I, JOHN R. PRICE, a citizen of the United States, residing at Brooklyn, in the county of Kings and State of New York, have invented certain new and useful Improvements in Brake Mechanism for Power-Driven Vehicles, of which the following is a specification.

This invention is specially designed for electrically-propelled vehicles, and is shown so applied; but some features are equally applicable to vehicles driven by other power.

My invention comprises an organization in which the brake-shoes are applied to the wheels by a piston or rod actuated by the armature of a solenoid energized by current from the distributing system, or, in the event of accident to the distributing-circuits or the jumping of a trolley from its conductor, by current generated by the car-motor then running as a dynamo-generator, and in either event provides for the automatic retention of the shoes in the braking position until their release or retraction is permitted or effected by a distinct act of the motorman.

The invention further comprises a switch mechanism and circuits by which the motorman controls the action of the brake.

The invention is hereinafter set forth in detail.

In the accompanying drawings, which show the invention applied to a car, Figure 1 is a view showing only so much of the construction as is requisite to illustrate the invention; Fig. 2, a longitudinal section through the brake-solenoid; Fig. 3, a vertical central section through the brake-controlling switch; and Fig. 4, a diagrammatic view showing the switch-controller contacts, the brake-solenoid, and the car-motors and circuits.

The brake-beams are marked A, the shoes $a$, and the pivoted brake-lever B, C C being the rods connecting the brake-beams and lever. The brake-solenoid D is suitably mounted and its piston or rod D' connected therewith is jointed to the brake-lever B. This latter part of the apparatus is shown in detail in Fig. 2. The spool $D^2$ is composed of brass or other non-magnetic material, and its hollow core or hub is perforated, as shown, to permit of the free passage of the lines of force. Two bobbins are wound upon this spool, one, $d$, in this instance the inner bobbin, being of coarse wire, and the other, $d'$, the outer bobbin, of fine wire. The armature E is laminated according to well-known principles of construction, being composed of an assemblage of soft-iron disks mounted upon the rod D', which latter has its bearings in the back plate E' and in a yoke or frame $E^2$, arranged at the front of the solenoid and mounted and held in any suitable manner. The whole structure is properly supported upon the truck or bottom of the car. When the armature is attracted, it draws upon the brake-lever and applies the brake-shoes to the wheels. In order to maintain the pressure of the shoes upon the wheels irrespective of the deënergizing of the solenoid, I provide a pivoted eccentric-block F, preferably grooved to embrace the rod D', and secure to the end thereof a spring F', attached to the yoke or frame $E^2$ and the strain of which applies the eccentric to the rod, so as to hold it firmly against retraction by the ordinary brake-springs. This device is, in other words, an eccentric friction-lock. In order that the rod D' may be released at will to permit the retraction of the shoes from the wheels, I provide a supplementary solenoid G, having an armature G', that may also be laminated, and which is connected by a rod $g$ to one end of the pivoted lever $g'$, whose opposite end is connected by a link or rod $g^2$ with the projection $f$ of the eccentric-block to which the spring F is attached. It is obvious that the vitalization of the supplementary solenoid G will, through the thrust of the rod $g^2$, cause the release of the rod D' by the eccentric-clutch. I have shown in other figures an organization of switch mechanism and circuits for controlling the solenoids D and G, and will presently describe them.

Referring now to Figs. 3 and 4, the controlling-switch K, which may be arranged, as indicated in Fig. 1, on the platform of a car adjacent to the regular switch-box, may consist, as shown, of the circular base carrying the insulated contacts, hereinafter described, and a centrally-pivoted switch-lever L, carrying on its under face contacts $l\ l'\ l^2\ l^3$, which sweep the segmental contacts on the base, each contact $l$ $l'$ $l^2$ $l^3$ being of such character as to bridge from one segmental contact to the next one near the center. In Fig. 7 the lever L is shown by dotted lines as occupying the neutral or zero position. When moved to the left, the contact $l$ first bridges the segmental contacts 1 of a rheostat R$h$ and the segmental contact 2. The contact $l'$ bridges the segmental contacts 3 4. The contact $l^2$ bridges the segmental contacts 5 6 and $l^3$ bridges the contacts 7 8. In this condition the solenoid D is energized to apply the brakes, as hereinbefore described, by currents from the distributing system, the circuit being as follows: By wire $m$, leading from the supply-conductor of the road, segmental contact 2, thence by contact $l$ to the rheostat-contacts from the end of the rheostat, by wire $m'$ to contact 3, through contact $l'$ to contact 4, thence by wire $m^2$ through the fine-wire coil of the solenoid D, thence by wire $m^3$ to contact 5, through $l^2$ to contact 6, thence by wire $m^4$ through the coarse-wire coil of the solenoid, thence by wire $m^5$ to contact 7, through $l^3$ to contact 8, and thence by wire $m^6$ to earth. The brakes will therefore be applied to the car with increasing power as the resistance of the rheostat is cut down. If, however, at such a time some accident occurred, as by the jumping of the trolley or otherwise and no current should be supplied to the solenoid, the motorman can apply to the braking of the car the current generated by the car-motor then being run as a generator. By the continued movement of the switch-lever L in the same direction it will pass out of engagement with the contacts 1 2 3 4 and into engagement with the contacts 9 10 11 12, the lever being brought into the position indicated by the dotted line 1 1. Under these conditions the circuit would be as follows: From the terminal $x$ of motor X, by wire $n$ to contact 11, thence through lever-contact $l'$ to contact 12, thence by wire $n'$ to wire $m^4$, leading to the coarse coil of the solenoid D, through that coil and by wire $m^5$ to the point $n^2$, thence by wire $n^3$ to contact 10, through lever-contact $l$ to contact 9, and by wire $n^4$ to the other terminal $x'$ of the motor X. In the event of there being two motors upon the car, as here shown, and to provide against the possible disability of motor X by a continued movement of the switch-lever into the position indicated by dotted line 2 2, the current derived from motor Y may in like manner be applied to energize the solenoid D. In this event the circuits would be as follows: From terminal $y$ of the motor Y by wire $o$ to contact 13, thence through lever-contact $l$ to contact 10, thence by wire $n^3$ to the point $n^2$, thence by wire $m^5$ through the coarse coil of the solenoid and by wire $m^4$ to the point $z$, thence by wire $n'$ to contact 12, through lever-contact $l'$ to contact 14, thence by wire $o^2$ to the other terminal $y'$ of the motor Y.

In any case when the brakes are applied to the wheels they are retained in the braking position, as already described, by the locking devices. Thus if the brakes be applied under the circumstances first described by current from the distributing-circuit and that current should because of any accident be withdrawn the brake-shoes will be held firmly against the wheels, and the same is true under either of the other conditions described. By such an organization I am enabled to brake a car quickly and lock the brakes without recourse to the ordinary hand-brakes, which are slow of action, and thus reduce to a very marked extent danger of accidents due to failure of brakes. When it is desired to release the brakes, the lever L is moved just beyond the zero position, so that its contacts come against the contacts 15 16 17 18, under which circumstances the supplementary solenoid G is energized and the locking device is released and permits the retraction of the shoes. The circuit is as follows: By wire $m$ to contact 16, thence by lever-contact $l$ to contact 15, thence through the rheostat and wire $m'$ and contact 3 to contact 17, thence by lever-contact $l'$ to contact 18, thence by wire $p$ through the coil of the supplementary solenoid G to earth or the other side of the circuit. This solenoid by the attraction of its armature releases the clutch or locking device, as already described.

In order to prevent tampering with the controlling-switch when its use is not required, I provide the following device: The handle that operates the lever L fits over the square end of the shaft and when in position forces downwardly the sliding collar $k$, below which is arranged a spiral spring $k'$, that normally tends to press it upwardly. The flange of this collar carries a locking-pin $k^2$, which enters a recess in the under face of the case K' of the switch-controller. When the lever L is brought to the zero position and the handle removed, the pin $k^2$ enters the socket referred to and locks the shaft and lever. In the organization described I have shown the motors X Y successively and independently thrown into action. Of course the circuit connections should be such as to place them in series or in parallel, but I prefer the organization shown, wherein the motor X may first be utilized as a generator, and in the event of its derangement then the motor Y, by merely pushing the handle of the switch-lever farther over.

I employ a coarse and fine wire coil in the solenoid D, for the reason that the two coils in series afford a great number of ampere turns and high resistance, and consequently low current consumption. When the switch-lever is placed in either of the positions 1 1 or 2 2, the fine-wire coil is cut out and the coarse coil of low resistance is connected in series with the motor.

I have shown and described an electromagnetic brake apparatus of the solenoid type. It is apparent, however, that other forms of electromagnetic brake devices are the equivalents of the solenoid form, and I do not, therefore, limit myself to the solenoid device, but intend that my claims shall cover also the equivalents thereof.

I claim as my invention—

1. The combination with the brake-frame, shoes and brake-lever of a vehicle, of a power-actuated piston or rod connected with the brake-lever, an automatically-actuated clutch consisting of a pivoted eccentric friction-block that engages said rod, and holds it positively in any position into which it may be brought in the application of the shoes to the wheels, and means for at will tripping said clutch.

2. The combination of an electrically-propelled vehicle, having two electric motors mounted thereon, its brake-shoes, brake-frame and brake-lever, an electromagnetic brake device operatively connected with the brake-lever, an automatically-acting clutch or locking device for locking the shoes in any braking position to which they may be brought, a supplementary electromagnetic device for tripping said locking device to permit the retraction of the shoes, a controlling-switch and circuit connections, whereby the switch in one position connects the electromagnetic brake device in circuit with the source of electrical energy by which the motors are driven to thereby apply the brakes, and which in a second position connects one of the motors in closed circuit with the electromagnetic brake device, and in a third position connects the second motor in closed circuit with the electromagnetic brake device.

3. The combination of an electrically-propelled vehicle, having two electric motors mounted thereon, its brake-shoes, brake-frame and brake-lever, an electromagnetic brake device operatively connected with the brake-lever, an automatically-acting clutch or locking device for locking the shoes in any braking position to which they may be brought, a supplementary electromagnetic device for tripping said locking device to permit the retraction of the shoes, a controlling-switch and circuit connections, whereby the switch in one position connects the electromagnetic brake device in circuit with the source of electrical energy by which the motors are driven to thereby apply the brakes, and which in a second position connects one of the motors in closed circuit with said device, and in a third position connects the second motor in closed circuit with said device, and which in the fourth position connects the supplementary electromagnetic device in circuit with the main source of electrical energy to thereby trip the locking device and permit the retraction of the brake-shoes.

4. The combination with the brake-shoes, brake-frame and brake-lever of a vehicle, of an electromagnetic brake device operatively connected with the brake-lever, a clutch device automatically acting to lock the brake-shoes in any braking position into which they may be brought by the action of said brake device, a supplementary electromagnetic device having an armature operatively connected with said locking device, whereby it may be tripped on the energizing of the supplementary device and circuit connections, and means to at will direct a current through the electromagnetic brake device to apply the brakes to the wheels, and through the tripping device to release the clutch and permit the retraction of the shoes.

5. The combination of the movable lever, of the circuit-controlling switch, its actuating-shaft adapted to receive the key or handle, the cover or casing, and a spring-actuated collar surrounding the shaft and having a locking projection adapted to engage a recess in the inner face of the cover, substantially as and for the purpose set forth.

6. The combination with the shoes, brake-frame and brake-lever of a vehicle, an electric motor carried by the vehicle and deriving current from a main source for its actuation, of an electromagnetic brake device having an armature mounted upon a piston operatively connected with the brake-lever and having a coarse and fine wire coil, a switch-controlling device having contacts and circuit connections to in one position direct the current from the source of electrical energy that propels the car through the two coils to apply the brakes to the wheels, and which in another position connects the car-motor in closed circuit with the coarse-wire coil, so that the current that may then be developed by the motor may be utilized to operate the brakes.

In testimony whereof I have hereunto subscribed my name.

JNO. R. PRICE.

Witnesses:
EDWARD C. DAVIDSON,
FRANK S. OBER.